US 012273012B2

(12) United States Patent
Ishikawa et al.

(10) Patent No.: US 12,273,012 B2
(45) Date of Patent: Apr. 8, 2025

(54) DRIVE DEVICE

(71) Applicant: NIDEC CORPORATION, Kyoto (JP)

(72) Inventors: Yuki Ishikawa, Kyoto (JP); Hitoshi Kuroyanagi, Kyoto (JP); Naohiro Wada, Kyoto (JP); Hironobu Kumagai, Kyoto (JP); Hisashi Fujihara, Kyoto (JP)

(73) Assignee: NIDEC COPORATION, Kyoto (JP)

( * ) Notice: Subject to any disclaimer, the term of this patent is extended or adjusted under 35 U.S.C. 154(b) by 343 days.

(21) Appl. No.: 17/785,049

(22) PCT Filed: Nov. 19, 2020

(86) PCT No.: PCT/JP2020/043277
§ 371 (c)(1),
(2) Date: Jun. 14, 2022

(87) PCT Pub. No.: WO2021/124792
PCT Pub. Date: Jun. 24, 2021

(65) Prior Publication Data
US 2023/0010604 A1    Jan. 12, 2023

(30) Foreign Application Priority Data

Dec. 17, 2019 (JP) .................................. 2019-227659

(51) Int. Cl.
*H02K 7/116*   (2006.01)
*H02K 5/16*    (2006.01)
(Continued)

(52) U.S. Cl.
CPC ............. *H02K 7/116* (2013.01); *H02K 5/161* (2013.01); *H02K 5/203* (2021.01); *H02K 7/083* (2013.01);
(Continued)

(58) Field of Classification Search
CPC ........ H02K 7/116; H02K 11/33; H02K 5/203; H02K 7/083; H02K 9/19; H02K 9/193
(Continued)

(56) References Cited

U.S. PATENT DOCUMENTS 8,201,650 B2   6/2012  Yoshida
9,136,745 B2   9/2015  Nagahama et al.
(Continued)

FOREIGN PATENT DOCUMENTS

JP    2014069755 A    4/2014
JP    2015065749 A    4/2015
(Continued)

OTHER PUBLICATIONS

International Search Report in PCT/JP2020/043277, mailed Feb. 2, 2021. 9pp.

*Primary Examiner* — Jose A Gonzalez Quinones
(74) *Attorney, Agent, or Firm* — HAUPTMAN HAM, LLP

(57) ABSTRACT

A drive device includes a motor and an inverter. A motor axis is parallel to an output axis. The inverter is located in a second direction orthogonal to a first direction with respect to the motor axis and extends in a third direction orthogonal to the first and second directions. When viewed from the first direction, a virtual straight line passing through the axes extends in the third direction. An inverter housing portion overlaps the axes when viewed from the second direction, and has a boundary wall on the virtual straight line side in the second direction. In the second direction, a distance between the boundary wall and the output axis is smaller than a distance between the boundary wall and the motor axis. A motor side connection portion has a portion closer to the side opposite to the output axis than the motor axis in the third direction.

18 Claims, 5 Drawing Sheets

(51) Int. Cl.
  *H02K 5/20* (2006.01)
  *H02K 7/08* (2006.01)
  *H02K 9/193* (2006.01)
  *H02K 11/33* (2016.01)
  *B60K 1/00* (2006.01)
(52) U.S. Cl.
  CPC ............ *H02K 9/193* (2013.01); *H02K 11/33* (2016.01); *B60K 1/00* (2013.01)
(58) Field of Classification Search
  USPC .............................. 310/75 R, 98, 99, 52–54
  See application file for complete search history.

(56) References Cited

U.S. PATENT DOCUMENTS

| | | | |
|---|---|---|---|
| 10,988,013 | B2 | 4/2021 | Chai et al. |
| 2004/0108778 | A1 | 6/2004 | Tsukamoto et al. |
| 2018/0290530 | A1* | 10/2018 | Chai ........................ B60K 1/00 |

FOREIGN PATENT DOCUMENTS

| | | | | |
|---|---|---|---|---|
| WO | WO-2019051824 | A1* | 3/2019 | .............. B60K 1/00 |
| WO | 2019076696 | A1 | 4/2019 | |
| WO | WO-2020179218 | A1* | 9/2020 | .............. B60L 50/51 |

* cited by examiner

DRIVE DEVICE

CROSS-REFERENCE TO RELATED APPLICATIONS

This is the U.S. national stage of application No. PCT/JP2020/043277, filed on Nov. 19, 2020, and priority under 35 U.S.C. § 119(a) and 35 U.S.C. § 365(b) is claimed from Japanese Patent Application No. 2019-227659, filed on Dec. 17, 2019.

FIELD OF THE INVENTION

The present invention relates to a drive device.

BACKGROUND

Conventionally, a drive device in which a motor, an inverter, and a transmission mechanism are integrated is known. For example, there is a drive device in which a motor, an inverter, and a transmission mechanism are integrated.

In a case where a drive device is used as a drive device for a vehicle, it is required to downsize a motor, an inverter, and a transmission mechanism.

SUMMARY

One aspect of an exemplary drive device of the present invention includes a motor having a rotor that rotates about a motor axis extending in a first direction and a stator, an inverter that supplies power to the motor, a transmission mechanism that transmits rotation output from the motor to an axle rotating about an output axis, and a housing that has a motor housing portion that accommodates the motor, an inverter housing portion that accommodates the inverter, and a gear housing portion that accommodates the transmission mechanism. The motor has a motor side connection portion protruding from the stator and electrically connected to the inverter. The motor axis and the output axis extend in parallel to each other. The inverter is located in a second direction orthogonal to the first direction with respect to the motor axis and extends in a third direction orthogonal to the first direction and the second direction. When viewed from the first direction, a virtual straight line passing through the motor axis and the output axis extends in the third direction. The inverter housing portion overlaps with the motor axis and the output axis when viewed from the second direction. The inverter housing portion has a boundary wall portion located at a boundary on the virtual straight line side of the inverter housing portion in the second direction. In the second direction, a distance between the boundary wall portion and the output axis is smaller than a distance between the boundary wall portion and the motor axis. The motor side connection portion has a portion located closer to the side opposite to the output axis than the motor axis in the third direction.

One aspect of an exemplary drive device of the present invention includes a motor having a rotor rotatable about a motor axis extending in a first direction, an inverter that controls current supplied to the motor, a transmission mechanism that transmits power of the motor to an axle, and a housing that accommodates the motor, the inverter, and a transmission mechanism. The housing includes an inverter housing portion that accommodates the inverter. The transmission mechanism has a reduction gear that decelerates rotation of the motor and a differential gear that transmits rotation of the motor decelerated by the reduction gear to an axle. The inverter housing portion and the differential gear overlap with each other when viewed from the first direction.

The above and other elements, features, steps, characteristics and advantages of the present disclosure will become more apparent from the following detailed description of the preferred embodiments with reference to the attached drawings.

DETAILED DESCRIPTION

Figure 1:
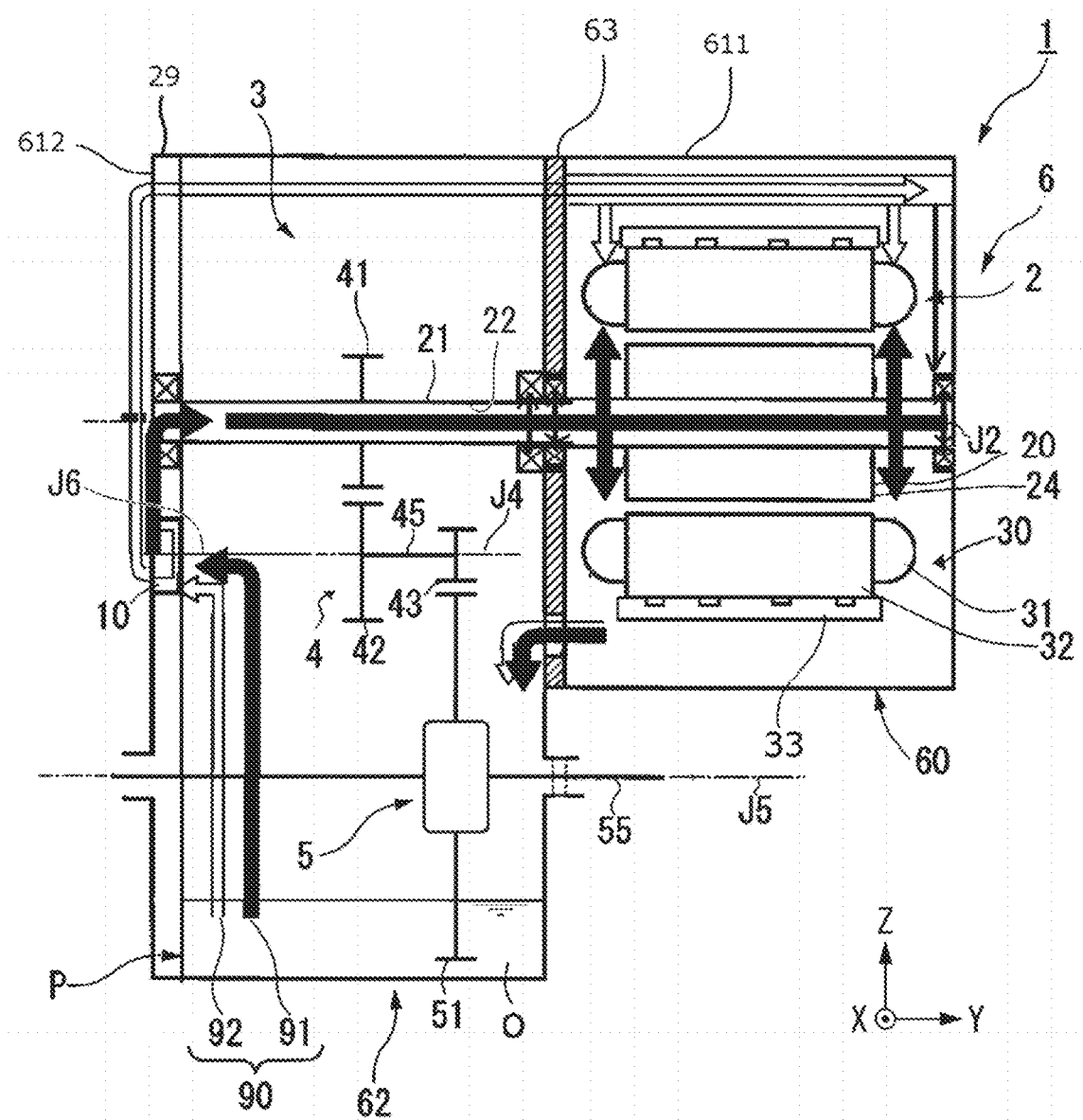
FIG. 1 is a conceptual diagram of a drive device of a first preferred embodiment.

A drive device 1 according to a first preferred embodiment of the present invention will be described with reference to FIGS. 1 to 3. The description below will be made with the direction of gravity being specified based on a positional relationship in a case where the drive device 1 is mounted in a vehicle located on a horizontal road surface. Further, in the drawings, an XYZ coordinate system is shown appropriately as a three-dimensional orthogonal coordinate system. In the XYZ coordinate system, a Z-axis direction corresponds to a vertical direction (that is, an up-down direction), and a +Z direction points upward (that is, in a direction opposite to the direction of gravity), while a −Z direction points downward (that is, in the direction of gravity). Further, an X-axis direction corresponds to a front-rear direction of a vehicle in which the drive device 1 is mounted, and is a direction perpendicular to the Z-axis direction, and a +X direction points forward of the vehicle, while a −X direction points rearward of the vehicle.

Note, however, that the +X direction and the −X direction may point rearward and forward, respectively, of the vehicle. A Y-axis direction is a direction perpendicular to both the X-axis direction and the Z-axis direction and indicates a width direction (lateral direction) of the vehicle. A +Y direction points left of the vehicle, while a −Y direction points right of the vehicle. Note, however, that, when the +X direction points rearward of the vehicle, the +Y direction may point right of the vehicle, and the −Y direction may point left of the vehicle. That is, the +Y direction simply points a first side in the lateral direction of the vehicle, and the −Y direction points a second side in the lateral direction of the vehicle, regardless of the direction of the X axis.

In description below, unless otherwise specified, a direction (that is, the Y-axis direction) parallel to a motor axis J2 of a motor 2 will be simply referred to by the term "axial direction", "axial", or "axially", radial directions around the motor axis J2 will be simply referred to by the term "radial direction", "radial", or "radially", and a circumferential direction around the motor axis J2, that is, a circumferential direction about the motor axis J2, will be simply referred to by the term "circumferential direction", "circumferential", or "circumferentially". Note, however, that the term "parallel" as used above includes both "parallel" and "substantially parallel". Specifically, "parallel" in the present preferred embodiment means that an angle between a pair of constituent elements translating (extending) in substantially the same direction, that is, an angle (inclination angle) at which one is inclined with respect to the other is 30° or less. Further, in the present preferred embodiment, a first side in the axial direction corresponds to the +Y direction, and a second side in the axial direction corresponds to the −Y direction. In the present preferred embodiment, a direction in which the motor axis J2 extends, that is, the Y-axis direction corresponds to a first direction. The X-axis direction corresponds to a second direction, and the Z-axis direction corresponds to a third direction.

The drive device 1 according to the present preferred embodiment is mounted in a vehicle having a motor as a power source, such as a hybrid vehicle (HEV), a plug-in hybrid vehicle (PHV), and an electric vehicle (EV), and is used as a power source of the vehicle.

As sshowed in FIG. 1, the drive device 1 includes the motor 2, a transmission mechanism 3, a housing 6, oil O accommodated in the housing 6, and an inverter unit (inverter). The inverter unit is accommodated in an inverter housing portion 8 of the housing 6. In the present preferred embodiment, the inverter unit includes an inverter and an inverter lid. That is, the drive device 1 includes the inverter and the inverter lid. The inverter lid covers an opening of the inverter housing portion 8. The inverter lid is fixed to an opening portion 661 of the inverter housing portion 8 described later with a screw member or the like.

The motor 2 includes a rotor 20 that rotates about the motor axis J2, which extends in a horizontal direction, a stator 30 located radially outside of the rotor 20, and a motor side connection portion 35. The motor axis J2 extends in the first direction. The housing 6 includes a motor housing portion 60 that accommodates the motor 2, a gear housing portion 62 that accommodates the transmission mechanism 3, a wall portion 63 that defines the motor housing portion 60 and the gear housing portion 62, and the inverter housing portion 8 that accommodates the inverter.

The motor 2 is an inner rotor type motor in which the rotor 20 is arranged inside the stator 30. The rotor 20 includes a shaft 21, a rotor core 24, and a rotor magnet (not showed).

The shaft 21 is arranged about the motor axis J2 extending in a horizontal direction and in a width direction of a vehicle. The shaft 21 is a hollow shaft having a hollow portion 22 inside. The shaft 21 protrudes from the motor housing portion 60 into the gear housing portion 62. An end portion of the shaft 21 protruding into the gear housing portion 62 is connected to the transmission mechanism 3. Specifically, the shaft 21 is connected to a first gear 41.

The stator 30 encloses the rotor 20 from outside in the radial direction. The stator 30 includes a stator core 32, a coil 31, and an insulator (not showed) interposed between the stator core 32 and the coil 31. The stator 30 is held by the motor housing portion 60. In the present preferred embodiment, the stator 30 is held by the motor housing portion 60 via a stator support member 33. A groove is provided on an inner peripheral surface or an outer peripheral surface of the stator support member 33 to form a water passage with the stator 30 or the motor housing portion 60. The stator 30 is cooled by cooling water supplied to the water passage from a radiator (not showed). The coil 31 is connected to the inverter unit.

Figure 2:
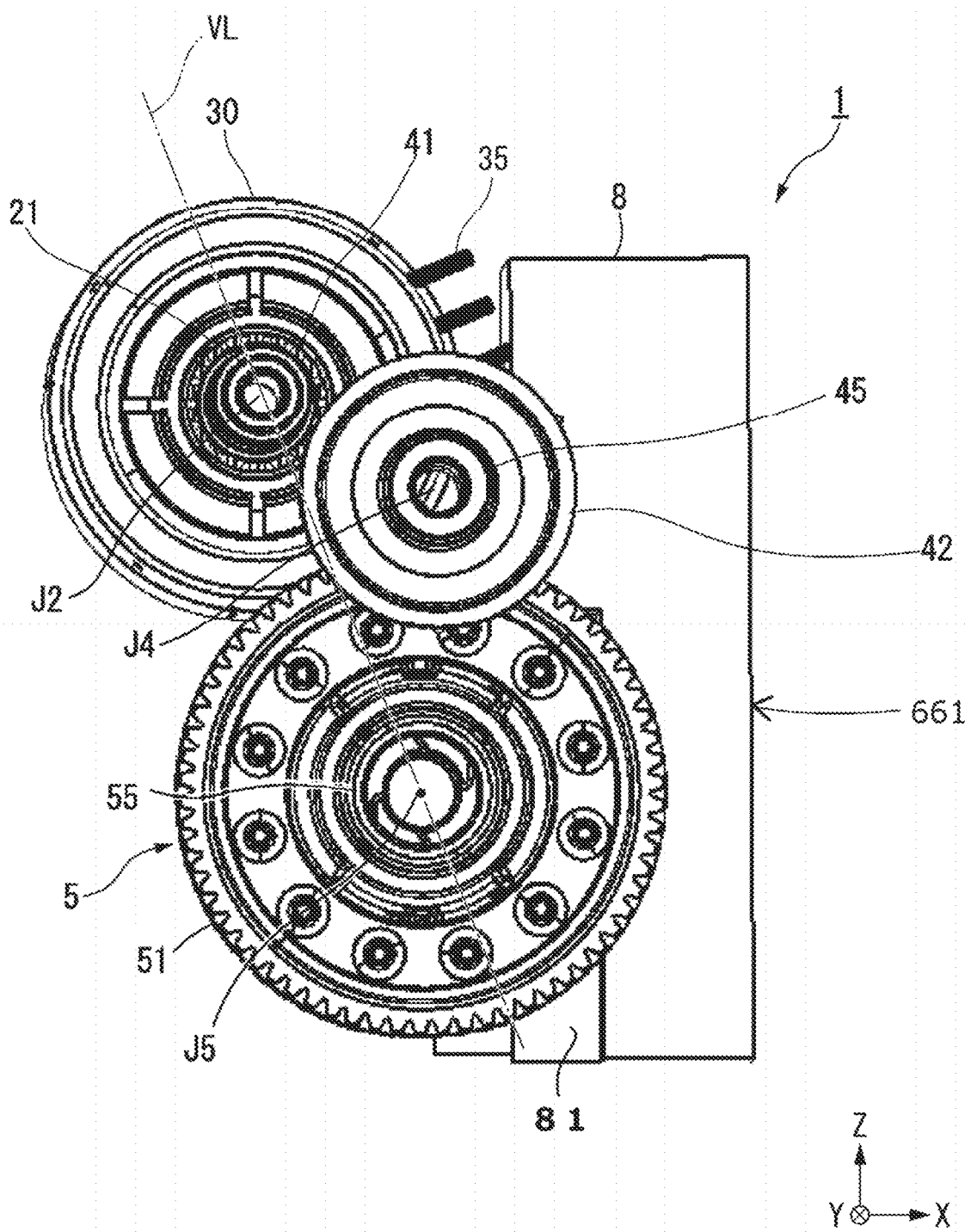
FIG. 2 is a diagram of a motor, a transmission mechanism, and an inverter in the drive device of the first preferred embodiment as viewed from an axial direction.
Figure 3:
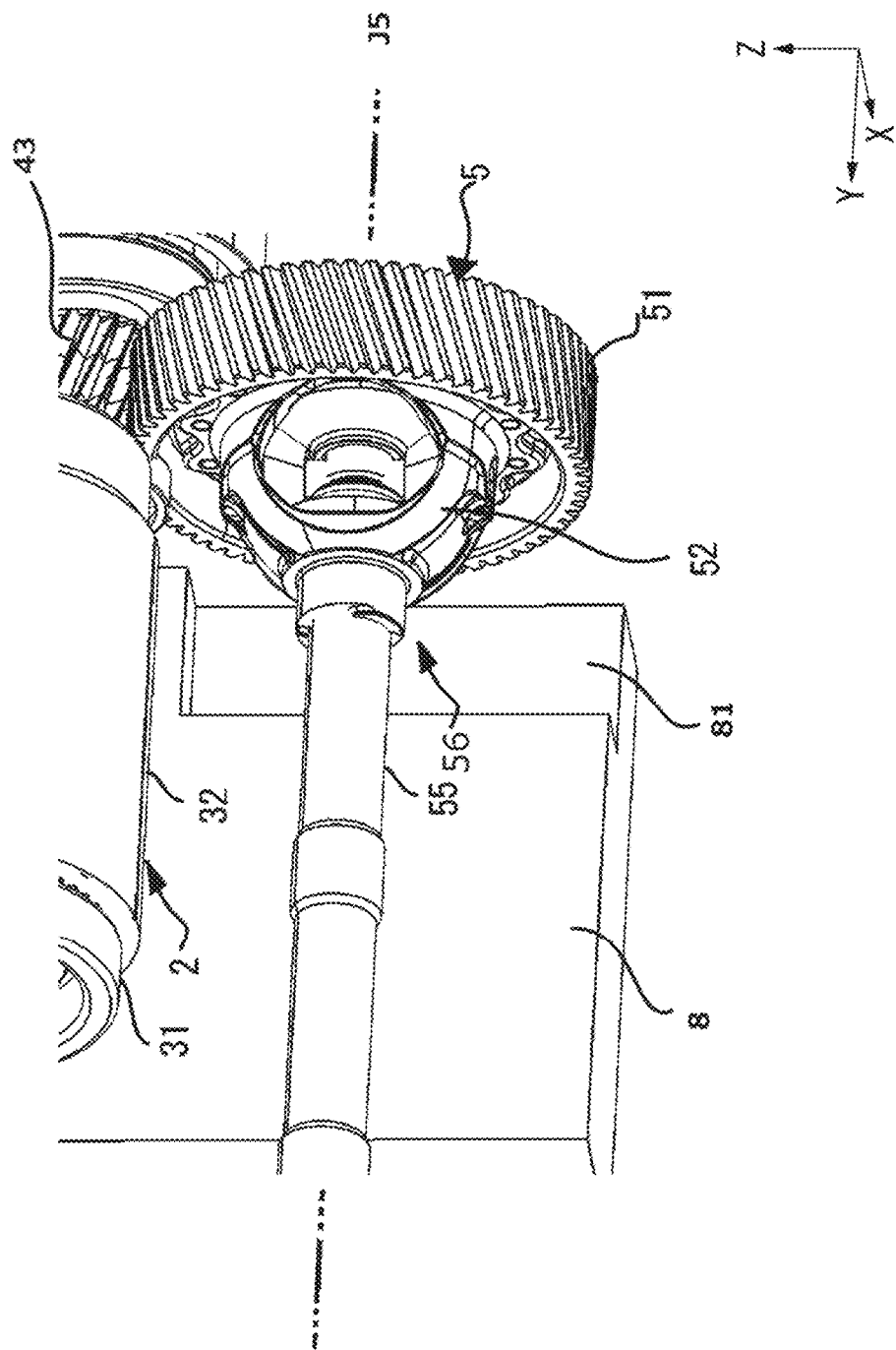
FIG. 3 is a perspective view of the motor, the transmission mechanism, and the inverter in the drive device of the first preferred embodiment.

As showed in FIG. 2, the motor side connection portion 35 protrudes from the stator 30. The motor side connection portion 35 is a wiring member or the like connected to the coil 31, and is, for example, a bus bar. The motor side connection portion 35 may include a plurality of conductive wires extending from the coil 31 and bundled. The motor side connection portion 35 protrudes radially outward from the stator core 32. The motor side connection portion 35 is electrically connected to the inverter.

As showed in FIG. 1, the transmission mechanism 3 transmits rotation output from the motor 2 to an axle 55 rotating about an output axis J5. That is, the transmission mechanism 3 transmits power of the motor 2 to the axle 55. The motor axis J2 and the output axis J5 extend in parallel to each other. In the present preferred embodiment, the motor axis J2 and the output axis J5 are arranged side by side in a substantially vertical direction. As showed in FIG. 2, when viewed from the first direction (Y-axis direction), a virtual straight line VL passing through the motor axis J2 and the output axis J5 extends in the Z-axis direction that is the third direction. That is, the virtual straight line VL extends in parallel with the third direction when viewed from the first direction.

As showed in FIG. 1, the transmission mechanism 3 is accommodated in the gear housing portion 62. The transmission mechanism 3 is connected to the shaft 21 on the second side in the axial direction of the motor axis J2. The transmission mechanism 3 includes a reduction gear 4 that decelerates the rotation of the motor 2 and a differential gear 5 that transmits rotation of the motor 2 decelerated in the reduction gear 4 to the axle 55. Torque output from the motor 2 is transmitted to the differential gear 5 through the reduction gear 4.

The reduction gear 4 is connected to the shaft 21 of the motor 2. The reduction gear 4 has the first gear 41, a second gear 42, a third gear 43, and an intermediate shaft 45. The first gear 41 is connected to the shaft 21 of the motor 2. The first gear 41 is fixed to the shaft 21 of the rotor 20. The intermediate shaft 45 extends along an intermediate axis J4 parallel to the motor axis J2. The second gear 42 and the third gear 43 are fixed to both ends of the intermediate shaft 45. The second gear 42 and the third gear 43 are connected to each other with the intermediate shaft 45 interposed between them. The second gear 42, the intermediate shaft 45, and the third gear 43 rotate about the intermediate axis J4. As showed in FIG. 2, the intermediate axis J4 is located in the second direction (X-axis direction) with respect to the virtual straight line VL. That is, the intermediate axis J4 is arranged away from the virtual straight line VL in the second direction. In the present preferred embodiment, the intermediate axis J4 is located on the front side (+X side) of the virtual straight line VL.

The second gear 42 is a counter gear. The second gear 42 meshes with the first gear 41. As showed in FIG. 1, the third gear 43 meshes with a ring gear 51 of the differential gear 5. The intermediate shaft 45 is connected to a pump unit 10 described later.

Torque output from the motor 2 is transmitted to the ring gear 51 of the differential gear 5 via the shaft 21 of the motor 2, the first gear 41, the second gear 42, the intermediate shaft 45, and the third gear 43. A gear ratio of each gear, the number of gears, and the like can be modified in various manners in accordance with a required reduction ratio. The reduction gear 4 is a speed reducer of a parallel-axis gearing type, in which axial centers of gears are arranged in parallel with each other.

The differential gear 5 transmits torque output from the motor 2 to the axle 55 of a vehicle. The differential gear 5 transmits the torque to the axles (drive shafts) 55 of both left and right wheels while absorbing a speed difference between the left and right wheels when a vehicle turns. The differential gear 5 includes a pinion gear, a pinion shaft, a side gear, and the like (not showed) in addition to the ring gear 51 meshing with the third gear 43 of the reduction gear 4 and a differential case 52. The ring gear 51 is connected to the reduction gear 4 and rotates about the output axis J5.

The oil O is arranged in at least one of the motor housing portion 60 and the gear housing portion 62. An oil reservoir P in which the oil O accumulates is provided in a lower region in the gear housing portion 62. In the present preferred embodiment, a bottom portion of the motor housing portion 60 is located higher than a bottom portion of the gear housing portion 62. With this configuration, the oil O after cooling the motor 2 can be easily recovered from a lower region of the motor housing portion 60 to the oil reservoir P of the gear housing portion 62.

A portion of the differential gear 5 soaks in the oil reservoir P. The oil O accumulated in the oil reservoir P is scraped up by operation of the differential gear 5. A part of the scraped oil O is supplied into the shaft 21. However, the oil O does not need to be supplied into the shaft 21. Another part of the oil O is diffused into the gear housing portion 62 and supplied to each gear of the reduction gear 4 and the differential gear 5. The oil O used for lubrication of the reduction gear 4 and the differential gear 5 is dropped and recovered in the oil reservoir P located below the gear housing portion 62.

The inverter unit controls current supplied to the motor 2. The inverter unit is fixed to the housing 6 and accommodated in the inverter housing portion 8. The inverter supplies power to the motor 2. As showed in FIG. 2, the inverter is located on the front side with respect to the motor axis J2, that is, in the second direction (X-axis direction), and extends in the third direction (Z-axis direction). According to the present preferred embodiment, since the inverter extends in the third direction, that is, a longitudinal direction of the drive device 1 in which the motor 2 and the transmission mechanism 3 are arranged side by side, the dimension in the second direction of the inverter unit can be reduced accordingly, and the thickness can be reduced.

As showed in FIG. 1, the pump unit 10 is an oil pump driven by the motor 2 via the first gear 41, the second gear 42, and the intermediate shaft 45. The pump unit 10 sucks up the oil O from the oil reservoir P. The motor 2 rotates a pump mechanism of the pump unit 10. In the drive device 1, a rotation axis J6 of the pump mechanism is parallel to the motor axis J2. Since the pump unit 10 is driven by the motor 2, the oil O can be sucked up without providing an additional auxiliary machine such as a pump driving motor. Further, since the pump unit 10 can be driven without changing a rotation direction of the intermediate shaft 45 by a bevel gear or the like, the dimension of the drive device 1 can be reduced.

The oil O circulates through an oil passage 90 provided in the housing 6. The oil passage 90 is a path of the oil O for supplying the oil O from the oil reservoir P to the motor 2. The oil passage 90 circulates the oil O to cool the motor 2.

The oil O is used to lubricate the reduction gear 4 and the differential gear 5. Further, the oil O is also used to cool the motor 2. The oil O accumulates in the oil reservoir P below the gear housing portion 62. Oil equivalent to an automatic transmission fluid (ATF) having a low viscosity is preferably used as the oil O so that the oil O can perform functions of lubricating oil and cooling oil.

As showed in FIG. 1, the oil passage 90 is a path of the oil O that is guided from the oil reservoir P on the lower side of the motor 2 to the oil reservoir P on the lower side of the motor 2 again via the motor 2. The oil passage 90 includes a first oil passage 91 passing through the inside of the motor 2 and a second oil passage 92 passing through the outside of the motor 2. The oil O cools the motor 2 from the inside and the outside through the first oil passage 91 and the second oil passage 92. However, either the first oil passage 91 or the second oil passage 92 may be excluded.

The oil O is pumped up by the pump unit 10 from the oil reservoir P, and is led into an interior of the rotor 20 through the first oil passage 91. The oil O is jetted from the rotor 20 toward the coil 31 to cool the stator 30. The oil O that has cooled the stator 30 moves to the oil reservoir P of the gear housing portion 62 via the lower region of the motor housing portion 60.

In the second oil passage 92, the oil O is pumped up from the oil reservoir P by the pump unit 10. The oil O is pumped up to an upper portion of the motor 2 and is supplied to the motor 2 from the upper side of the motor 2. The oil O that has cooled the motor 2 moves to the oil reservoir P of the gear housing portion 62 via the lower region of the motor housing portion 60.

The housing 6 includes the motor housing portion 60 having a cylindrical or substantially cylindrical shape extending along the motor axis J2, the gear housing portion 62 located on the second side in the axial direction of the motor housing portion 60, and the wall portion 63 that defines the motor housing portion 60 and the gear housing portion 62. In the present preferred embodiment, the housing 6 includes a first member 611 constituting a bottom portion and a cylindrical portion of the motor housing portion 60 and a cylindrical portion of the gear housing portion 62, a second member 612 located on the second side in the axial direction of the gear housing portion 62, and the wall portion 63 defining the motor housing portion 60 and the gear housing portion 62. The motor housing portion 60 accommodates the motor 2 inside. The gear housing portion 62 accommodates the transmission mechanism 3 inside. The wall portion 63 supports a bearing that rotatably supports the shaft 21 and a bearing that rotatably supports the intermediate shaft 45.

The stator 30 of the motor 2 is fixed inside the motor housing portion 60.

The gear housing portion 62 has a plurality of vehicle body fixing portions (not showed) on a surface facing the second side in the axial direction. The drive device 1 is fixed to a frame of a vehicle via a mount bracket or an insulator by a bolt fastened to the vehicle body fixing portion.

The inverter housing portion 8 extends to the forward side (+X side) from the cylindrical portion of the motor housing portion 60. The inverter housing portion 8 has a rectangular box or substantially rectangular box shape when viewed from the front side. As showed in FIG. 2, the inverter housing portion 8 overlaps with the motor axis J2 and the output axis J5 when viewed from the second direction (X-axis direction). The inverter housing portion 8 has the opening portion 661 that opens in one direction. In the present preferred embodiment, the inverter housing portion 8 opens toward the front side of a vehicle. Further, the opening portion 661 extends in the third direction. The inverter unit is mounted on the opening portion 661 of the inverter housing portion 8. By mounting the inverter unit on the opening portion 661 of the inverter housing portion 8, the opening portion 661 of the inverter housing portion 8 is covered and closed. The inverter lid that covers the opening portion 661 also extends in the third direction. That is, the inverter unit extends in the third direction. The inverter unit is electrically connected to the coil 31 of the stator 30 inside the motor housing portion 60. Specifically, the inverter includes an inverter side connection portion (not showed) electrically connected to the motor 2. The inverter side connection portion is connected to the motor side connection portion 35 via, for example, a bus bar or the like. The motor side connection portion 35 has a portion located closer to the side opposite to the output axis J5 than the motor axis J2 in the third direction (Z-axis direction). According to the present preferred embodiment, since the motor side connection portion 35 is arranged close to an end portion on a first side (upper side) in the third direction of the inverter housing portion 8, it is easy to secure an arrangement space for an electronic component and the like on a substrate in the inverter housing portion 8, and it is possible to further reduce the thickness.

In the housing 6, the inverter housing portion 8, the cylindrical portion of the motor housing portion 60, and the cylindrical portion of the gear housing portion 62 are a part of a single die-cast component. In other words, the motor housing portion 60 and the inverter housing portion 8 are a single member. For this reason, as compared with a case where the inverter housing portion 8 as a separate body is fixed to the motor housing portion 60 using a bolt or the like, vibration can be suppressed and noise can be reduced. Further, since the inverter housing portion 8 is integrated with the cylindrical portion of the motor housing portion 60 and the cylindrical portion of the gear housing portion 62, the inverter housing portion 8 can be arranged near the motor 2, and the entire drive device 1 can be downsized.

Further, according to the present preferred embodiment, the transmission mechanism 3 includes the reduction gear 4 and the differential gear 5, and the inverter housing portion 8 and the differential gear 5 overlap with each other when viewed from the motor axial direction, that is, the first direction. In this manner, the inverter and the differential gear 5 can be arranged close to each other, and the entire drive device 1 can be downsized.

Further, according to the present preferred embodiment, the motor 2 and the differential gear 5 overlap with each other when viewed from the first direction. In this manner, the motor 2 and the differential gear 5 can be arranged close to each other, and the entire drive device 1 can be downsized.

Further, according to the present preferred embodiment, the reduction gear 4 and the inverter housing portion 8 overlap with each other when viewed from the first direction. In this manner, the reduction gear 4 and the inverter can be arranged close to each other, and the entire drive device 1 can be downsized.

Further, according to the present preferred embodiment, the inverter housing portion 8 has a rectangular box or substantially rectangular box shape having the opening portion 661 opened in one direction, and overlaps with a part of the differential gear 5 when viewed from a direction orthogonal to the first direction. As showed in FIG. 3, a portion 81 overlapping with the part of the differential gear 5 in the inverter housing portion 8 is located closer to the opening direction side than another portion of the inverter housing portion 8. In this manner, the differential gear 5 and the inverter can be arranged close to each other, and the entire drive device 1 can be downsized.

Further, according to the present preferred embodiment, the differential gear 5 includes the ring gear 51 meshing with the third gear 43 of the reduction gear 4 and the differential case 52 having an outer diameter smaller than that of the ring gear 51. The inverter housing portion 8 overlaps with the differential case 52 when viewed from the direction orthogonal to the first direction. The portion 81 overlapping with the part of the differential gear 5 in the inverter housing portion 8 is located closer to the opening direction side, that is, the opening portion 661 side than another portion of the inverter housing portion 8. In this manner, the differential gear 5 and the inverter can be arranged close to each other, and the entire drive device 1 can be downsized. In particular, according to this configuration, if the shape of the inverter housing portion 8, which is an arrangement space of the inverter, is not a rectangular shape, and a portion for accommodating the differential case 52 is extended to a part of the rectangular shape, the inverter and the differential gear 5 can be arranged even closer to each other. In this manner, the entire drive device 1 can be downsized.

Further, according to the present preferred embodiment, the inverter housing portion 8 has a first region that is made smaller at a position overlapping with the differential case 52 in the axial direction when viewed from a direction orthogonal to the motor axis (first direction). In other words, the inverter housing portion 8 has a shorter distance from the opening portion 661 in the first region. In this manner, the inverter and the differential gear 5 can be arranged closer to each other. In this manner, the entire drive device 1 can be downsized.

Further, according to the present preferred embodiment, the drive shaft 55 to which rotation is transmitted from the differential gear 5 is provided, the housing 6 has a bearing support portion 56 that supports a bearing that rotatably supports the drive shaft 55 in a portion axially separated from the ring gear 51, and the bearing support portion 56 faces the inverter housing portion 8 in the radial direction. In this manner, the bearing that supports the drive shaft 55 can be supported by a wall constituting the inverter housing portion 8. For this reason, the inverter can be brought close to the drive shaft 55, and the entire drive device 1 can be downsized.

Next, a drive device 100 according to a second preferred embodiment of the present invention will be described with reference to FIGS. 4 and 5. Note that, in the present preferred embodiment, the same names or the same reference numerals are given to the same configurations as those of the above-described preferred embodiment, and the description of such configurations may be omitted.

In the present description, a vertical direction is defined and described based on a positional relationship when the drive device 100 is mounted on a vehicle positioned on a horizontal road surface. A relative positional relationship with respect to the vertical direction needs to be satisfied at least when the drive device 100 is mounted on a vehicle positioned on a horizontal road surface.

In the drawings, an XYZ coordinate system is showed appropriately as a three-dimensional orthogonal coordinate system. Note that, in the present preferred embodiment, the direction in which the motor axis J2 extends, that is, the Y-axis direction corresponds to the first direction, the Z-axis direction corresponds to the second direction, and the X-axis direction corresponds to the third direction.

Figure 4:
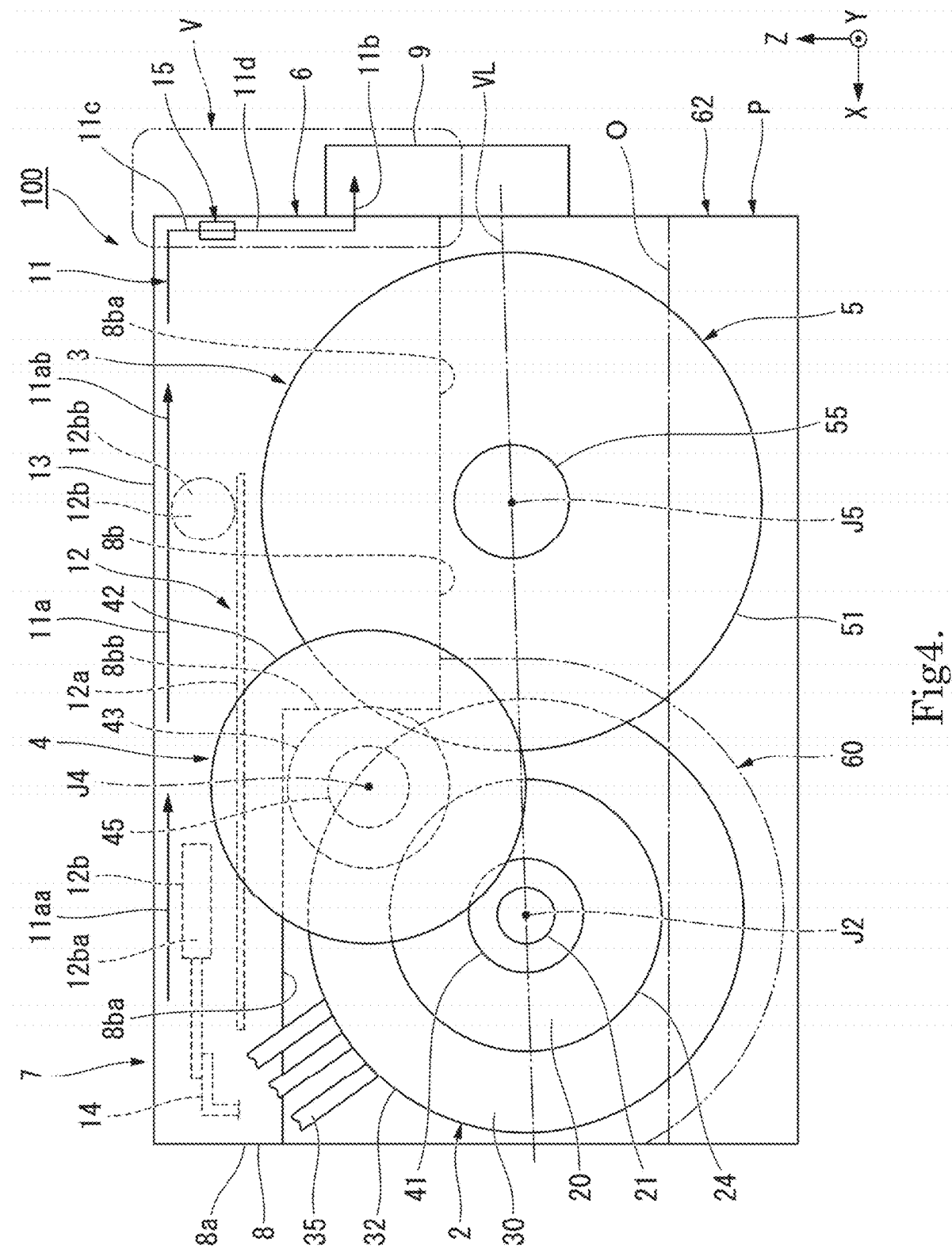
FIG. 4 is a side view showing a drive device of a second preferred embodiment.

As showed in FIG. 4, the drive device 100 of the present preferred embodiment includes the motor 2, the transmission mechanism 3, an inverter unit 7, the housing 6, the oil O, an oil passage (not showed), a heat exchanger 9, a pump (not showed), and a refrigerant channel 11. The inverter unit 7 includes an inverter 12 and an inverter lid 13. That is, the drive device 100 includes the inverter 12 and the inverter lid 13.

In the present preferred embodiment, the motor axis J2 and the output axis J5 are arranged side by side in a substantially horizontal direction. As showed in FIG. 4, when viewed from the first direction (Y-axis direction), the virtual straight line VL passing through the motor axis J2 and the output axis J5 extends in the X-axis direction that is the third direction.

The intermediate axis J4 is located in the second direction (Z-axis direction) with respect to the virtual straight line VL. In the present preferred embodiment, the intermediate axis J4 is located on the upper side (+Z side) of the virtual straight line VL. When viewed from the first direction, the second gear 42, that is, the counter gear, and the inverter 12 overlap with each other. In general, since the counter gear 42 has a smaller diameter than the motor 2 and the ring gear 51, the bulkiness in the dimension in the second direction of the entire drive device 100 can be suppressed as the center (intermediate axis J4) of the counter gear 42 is shifted in the second direction from the virtual straight line VL. Then, since the counter gear 42 and the inverter 12 overlap with each other when viewed from the first direction, the entire drive device 100 can be more flattened in the second direction. Further, when viewed from the first direction, the ring gear 51 overlaps with the inverter housing portion 8. That is, also in the present preferred embodiment, the inverter housing portion 8 and the differential gear 5 overlap with each other when viewed from the first direction. Further, when viewed from the first direction, the motor 2 and the differential gear 5 overlap with each other. Further, when viewed from the first direction, the reduction gear 4 and the inverter housing portion 8 overlap with each other.

The inverter 12 is located above, that is, in the second direction (Z-axis direction), with respect to the motor axis J2 and extends in the third direction (X-axis direction). The inverter 12 has a flat plate or substantially plate shape extending in a direction perpendicular to the second direction. The inverter 12 includes one or a plurality of substrates 12a, a plurality of electronic components 12b, and an inverter side connection portion 14. The substrate 12a and the electronic component 12b are fixed to the inverter lid 13. That is, the inverter 12 is fixed to the inverter lid 13.

At least one of the substrates 12a overlaps with the motor axis J2 and the output axis J5 when viewed from the second direction. According to the present preferred embodiment, since the substrate 12a overlaps with the motor axis J2 and the output axis J5 when viewed from the second direction, a large substrate on which a large number of electronic components can be mounted can be employed. For example, the cost can be reduced according to the present preferred embodiment as compared with a case where a plurality of small substrates is stacked and arranged.

The plurality of electronic components 12b include a switching element 12ba and a capacitor 12bb. That is, the inverter 12 includes the switching element 12ba and the capacitor 12bb. The switching element 12ba and the capacitor 12bb are fixed to the inverter lid 13. The switching element 12ba is, for example, an insulated gate bipolar transistor (IGBT). The capacitor 12bb overlaps with the output axis J5 when viewed from the second direction. According to the present preferred embodiment, as an electronic component, the capacitor 12bb having a bulky outer shape is arranged at a position overlapping with the output axis J5 when viewed from the second direction, so that a dead space above the output axis J5 can be used, and the drive device 100 can be reduced in thickness. Further, for example, there is a case where it is necessary to lower an upper end position of a portion overlapping with the output axis J5 of the inverter unit 7 as viewed from the second direction to the lower side for a reason due to a vehicle layout or the like. Even in such a case, when the capacitor 12bb is arranged at the position overlapping with the output axis J5 as described above, it is easy to change the design. Note that, when such a design change is performed, for example, the substrate 12a may be inclined so as to be positioned on the lower side (−Z side) toward the rear side (−X side). Further, when the size of the capacitor 12bb is large, the capacitor 12bb can be arranged below the substrate 12a. In either case, a dead space above the output axis J5 can be used, and the drive device 100 can be reduced in thickness.

The inverter side connection portion 14 is located in an end portion on a first side in the third direction of the inverter 12 and is electrically connected to the motor 2. In the present preferred embodiment, the first side in the third direction is the front side (+X side), and a second side in the third direction is the rear side (−X side). The inverter side connection portion 14 is connected to the motor side connection portion 35 via, for example, a bus bar or the like. Also in the present preferred embodiment, the motor side connection portion 35 has a portion located closer to the side opposite to the output axis J5 than the motor axis J2 in the third direction (X-axis direction).

In the housing 6, at least a part of the motor housing portion 60, at least a part of the gear housing portion 62, and the inverter housing portion 8 are portions of a single member. At least the part of the motor housing portion 60, at least the part of the gear housing portion 62, and the inverter housing portion 8 constitute a part of a single die-cast component.

The inverter housing portion 8 has a bottomed cylindrical or substantially bottomed cylindrical shape that opens upward. The inverter housing portion 8 extends in the third direction. Also in the present preferred embodiment, the inverter housing portion 8 overlaps with the motor axis J2 and the output axis J5 when viewed from the second direction (Z-axis direction). An end on the first side in the third direction of the inverter housing portion 8 overlaps with an end portion on the first side in the third direction of the stator 30 when viewed from the second direction. According to the present preferred embodiment, since the inverter housing portion 8 extends to an outer end portion of the stator 30 on the first side in the third direction, it is possible to secure a large dimension of the inverter housing portion 8 in the third direction, that is, a large dimension of the inverter housing portion 8 in the longitudinal direction of the drive device 100, so that it is possible to further reduce the thickness in the second direction.

The inverter housing portion 8 includes a peripheral wall portion 8a and a boundary wall portion 8b. The peripheral wall portion 8a has a cylindrical or substantially cylindrical shape extending in the second direction, and is, for example, a square cylindrical shape. The boundary wall portion 8b has a plate or substantially plate shape. The boundary wall portion 8b is located on the virtual straight line VL side, that is, at a lower boundary of the inverter housing portion 8 in the second direction. The boundary wall portion 8b separates the inside and the outside of the inverter housing portion 8 in the second direction. The positions in the second direction of the boundary wall portion 8b are different from each other at each position in the third direction of the boundary wall portion 8b. In the present preferred embodiment, the boundary wall portion 8b includes a pair of first plate portions 8ba extending in a direction perpendicular to the second direction and at different positions in the second direction, and a second plate portion 8bb connecting the pair of first plate portions 8ba and extending in a direction perpendicular to the third direction. The second plate portion 8bb is not limited to the above configuration, and may extend in the circumferential direction along the outer periphery of the motor 2, or may have another shape, for example. Note that the boundary wall portion 8b may be referred to as a bottom wall portion.

In the present preferred embodiment, a distance between the boundary wall portion 8b and the output axis J5 is smaller than a distance between the boundary wall portion 8b and the motor axis J2 in the second direction. Specifically, the distance between the output axis J5 and the first plate portion 8ba located on the second side in the third direction of the pair of first plate portions 8ba is shorter than the distance between the motor axis J2 and the first plate portion 8ba located on the first side in the third direction of the pair of first plate portions 8ba. That is, in a portion of the inverter housing portion 8 overlapping the output axis J5 as viewed from the second direction, the boundary wall portion 8b is arranged close to the output axis J5, so that a large accommodating space for members is secured. For this reason, among constituent members of the inverter 12, an electronic component or the like that tends to be bulky in dimensions is arranged in the portion of the accommodation space, so that a dead space in the housing 6 can be effectively utilized, and the drive device 100 can be downsized.

The inverter lid 13 has a flat plate or substantially plate shape extending in a direction perpendicular to the second direction. The inverter lid 13 extends in the third direction. The inverter lid 13 covers an opening of the inverter housing portion 8. The inverter lid 13 is attached to the inverter housing portion 8 from a predetermined direction. In the present preferred embodiment, the direction in which the inverter lid 13 is attached to the inverter housing portion 8 is the second direction (Z-axis direction). That is, the predetermined direction is the second direction, specifically, the vertical direction. As showed in FIG. 5, the inverter lid 13 is fixed to the inverter housing portion 8 by being fastened by a screw member (not showed) or the like from the second direction in a state of being placed on the opening portion of the inverter housing portion 8, that is, in a state of being in contact with the opening portion. According to the present preferred embodiment, since the inverter 12 is fixed to the inverter lid 13, specifically, the substrate 12a and the electronic component 12b are fixed, heat from the motor 2 side is less likely to be transferred, and cooling efficiency of each constituent element of the inverter 12 by the refrigerant channel 11 described later is enhanced. The inverter housing portion 8 or the inverter lid 13 has a cylindrical member 15. The cylindrical member 15 extends in a predetermined direction, that is, the second direction. Configurations other than the above of the cylindrical member 15 will be described later.

Figure 5:
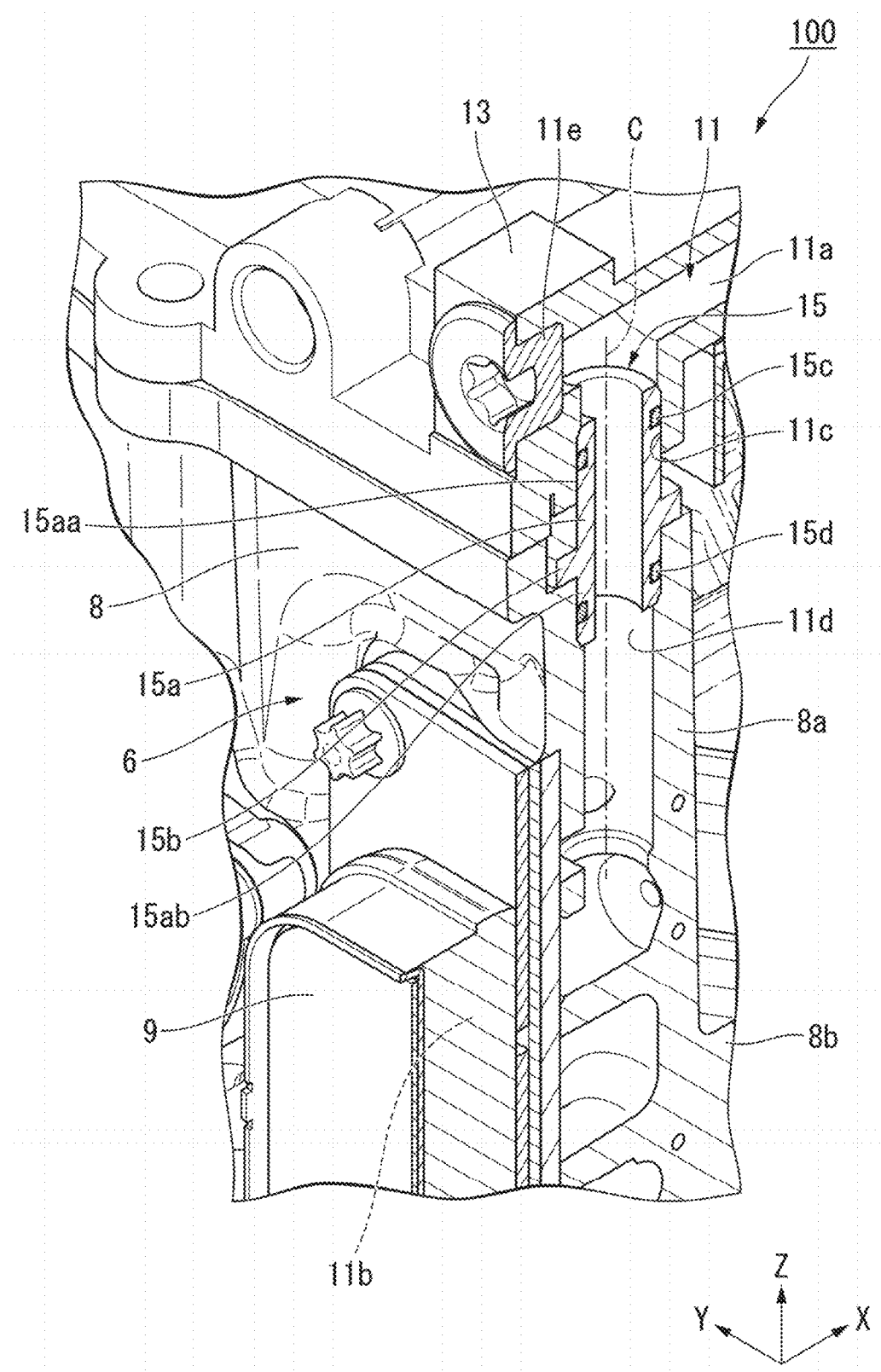
FIG. 5 is an enlarged perspective view of a portion V of FIG. 4.

As showed in FIGS. 4 and 5, the heat exchanger 9 is fixed to the housing 6. In the present preferred embodiment, the heat exchanger 9 is located closer to the side opposite to the motor axis J2 than the output axis J5 in the third direction. The heat exchanger 9 is fixed to a wall portion facing the second side in the third direction of the housing 6. The heat exchanger 9 has a portion facing the inverter housing portion 8. In the present preferred embodiment, an upper portion of the heat exchanger 9 faces the peripheral wall portion 8a of the inverter housing portion 8. According to the present preferred embodiment, it is possible to effectively utilize a dead space that has not been used in a conventional drive device. Although not particularly showed, a part of the oil passage through which the oil O circulates passes through the heat exchanger 9. That is, the part of the oil passage through which the oil O flows is arranged in the heat exchanger 9.

Although not particularly showed, the pump of the present preferred embodiment is, for example, an electric oil pump. The pump is fixed to the housing 6. In the present preferred embodiment, the pump is located closer to the side opposite to the motor axis J2 than the output axis J5 in the third direction. The pump is fixed to a wall portion facing the second side in the third direction of the housing 6. The pump is arranged side by side with the heat exchanger 9 in the first direction, for example. The pump sends the oil O sucked up from the oil reservoir P to the heat exchanger 9. The oil O heat-exchanged with the cooling medium in the heat exchanger 9 is supplied to the motor 2 from, for example, the upper side of the stator 30 and the inside of the shaft 21.

As showed in FIG. 4, the refrigerant channel 11 passes through the inverter lid 13, a part of the housing 6, and the heat exchanger 9. A cooling medium cooled by a radiator (not showed) flows through the refrigerant channel 11. The refrigerant channel 11 cools the inverter unit 7 and the oil O. The refrigerant channel 11 includes an electronic component cooling portion 11a, a heat exchange portion 11b, a lid side opening portion 11c, a housing portion side opening portion 11d, and a seal bolt 11e.

The electronic component cooling portion 11a is arranged on the inverter lid 13 and cools the electronic component 12b. The cooling medium flows through the electronic component cooling portion 11a from the first side to the second side in the third direction. The electronic component cooling portion 11a includes a switching element cooling portion 11aa and a capacitor cooling portion 11ab. The switching element cooling portion 11aa cools the switching element 12ba. The capacitor cooling portion 11ab is arranged closer to the second side in the third direction than the switching element cooling portion 11aa of the inverter lid 13, and cools the capacitor 12bb. The capacitor cooling portion 11ab is located closer to the downstream side of the refrigerant channel 11 than the switching element cooling portion 11aa. A cooling medium flowing through a portion located on the inverter lid 13 of the refrigerant channel 11 cools the switching element 12ba, then cools the capacitor 12bb, and, after that, cools the oil O of the heat exchanger 9. According to the present preferred embodiment, it is possible to efficiently cool members from one having a larger heating value.

The heat exchange portion 11b is arranged in the heat exchanger 9 and exchanges heat between the oil O and the cooling medium. The heat exchange portion 11b is a portion located in the heat exchanger 9 of the refrigerant channel 11, and the oil O is cooled by the cooling medium flowing through the heat exchange portion 11b.

As showed in FIG. 5, the lid side opening portion 11c is arranged in a portion that connects the electronic component cooling portion 11a and the heat exchange portion 11b of the refrigerant channel 11, and is open to the inverter lid 13. The lid side opening portion 11c opens on the lower side of the inverter lid 13, that is, a surface facing the inverter housing portion 8 side, and extends in the second direction. The lid side opening portion 11c has, for example, a circular hole shape.

The housing portion side opening portion 11d is arranged in a portion connecting the electronic component cooling portion 11a and the heat exchange portion 11b of the refrigerant channel 11, and opens to the inverter housing portion 8. The housing portion side opening portion 11d opens on the upper side of the inverter housing portion 8, that is, a surface facing the inverter lid 13 side, and extends in the second direction. In the present preferred embodiment, the housing portion side opening portion 11d opens on an upper end surface of the peripheral wall portion 8a and extends in the second direction inside the peripheral wall portion 8a. The housing portion side opening portion 11d has, for example, a circular hole shape.

When viewed from a predetermined direction, that is, when viewed from the second direction (Z-axis direction) in the present preferred embodiment, the lid side opening portion 11c and the housing portion side opening portion 11d overlap with each other and face each other. According to the present preferred embodiment, since the lid side opening portion 11c and the housing portion side opening portion 11d face each other in the second direction in which the inverter lid 13 is attached to the inverter housing portion 8, a portion located at the inverter lid 13 of the refrigerant channel 11 and a portion located in the inverter housing portion 8 are connected as the inverter lid 13 is assembled to the housing 6. For this reason, a hose member or the like for connecting portions of the refrigerant channel to each other as in a conventional technique is unnecessary, and according to the present preferred embodiment, the number of parts is reduced, and an assembly process can be simplified.

The seal bolt 11e covers an end portion on the second side in the third direction of the electronic component cooling portion 11a. The seal bolt 11e is fixed to the end portion on the second side in the third direction of the electronic component cooling portion 11a with a screw. As the seal bolt 11e is provided, a portion of a channel that changes the direction of flow from the electronic component cooling portion 11a to the lid side opening portion 11c can be configured compactly and simply. Further, as the seal bolt 11e is removed, the inside of the channel of the electronic component cooling portion 11a can be easily accessed.

The cylindrical member 15 has a pipe shape around a central axis C. The central axis C of the cylindrical member 15 extends in a predetermined direction, that is, the second direction. The lid side opening portion 11c and the housing portion side opening portion 11d are connected via the cylindrical member 15. According to the present preferred embodiment, as the cylindrical member 15 is provided, leakage of the cooling medium is suppressed in a connection portion between the lid side opening portion 11c and the housing portion side opening portion 11d in the refrigerant channel 11.

The cylindrical member 15 includes a cylindrical body 15a, a flange portion 15b, a through hole (not showed), a fixing member (not showed), and a plurality of O-rings 15c and 15d. The cylindrical body 15a extends in a predetermined direction, that is, the second direction. The cylindrical body 15a has a cylindrical or substantially cylindrical shape around the central axis C. The cylindrical body 15a includes a first insertion portion 15aa inserted into the lid side opening portion 11c and a second insertion portion 15ab inserted into the housing portion side opening portion 11d. That is, the cylindrical member 15 includes the first insertion portion 15aa and the second insertion portion 15ab.

The flange portion 15b protrudes from an outer peripheral surface of the cylindrical body 15a. The flange portion 15b has a plate or substantially plate shape extending in a direction perpendicular to the central axis C. The flange portion 15b has an annular shape around the central axis C of the cylindrical member 15, and has an annular plate shape in the present preferred embodiment. Although not particularly showed, the through hole penetrates the flange portion 15b in a predetermined direction. A plurality of the through holes are provided on the flange portion 15b at intervals around the central axis C. The fixing member is, for example, a screw member or the like. A plurality of the fixing members are provided. The number of fixing members is the same as the number of through holes. The fixing member is inserted into the through hole and fixed to the inverter housing portion 8 or the inverter lid 13. That is, the cylindrical member 15 is fixed to the inverter housing portion 8 or the inverter lid 13. According to the present preferred embodiment, the cylindrical member 15 can be accurately attached to the inverter housing portion 8 or the inverter lid 13, and leakage of the cooling medium from a connection portion between the lid side opening portion 11c and the housing portion side opening portion 11d is further suppressed.

The O-rings 15c and 15d are annular and elastically deformable. In the present preferred embodiment, a pair of the O-rings 15c and 15d are provided. The pair of O-rings 15c and 15d are attached to the first insertion portion 15aa and the second insertion portion 15ab, respectively, and are in contact with an inner peripheral surface of the lid side opening portion 11c or an inner peripheral surface of the housing portion side opening portion 11d.

Although the preferred embodiments of the present invention are described above, the configurations described in the preferred embodiments and the combination of the configurations are merely examples, and addition, omission, substitution, and other alterations may be appropriately made within a range not deviating from the gist of the present invention. Further, the present invention is not limited by the preferred embodiments. For example, in the above-described preferred embodiment, it is described that the heat exchanger 9 cools the oil O by the cooling medium flowing inside. However, in other words, the heat exchanger 9 may be configured to heat the cooling medium by the oil O flowing inside.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A drive device comprising:
a motor having a rotor that rotates about a motor axis extending in a first direction and a stator;
an inverter that supplies power to the motor;
a transmission mechanism that transmits rotation output from the motor to an axle rotating about an output axis; and
a housing that has a motor housing portion that accommodates the motor, an inverter housing portion that accommodates the inverter, and a gear housing portion that accommodates the transmission mechanism, wherein
the motor has a motor side connection portion that protrudes from the stator and is electrically connected to the inverter,
the motor axis and the output axis extend in parallel to each other,
the inverter is located in a second direction orthogonal to the first direction with respect to the motor axis and extends in a third direction orthogonal to the first direction and the second direction, a virtual straight line passing through the motor axis and the output axis when viewed from the first direction extends in the third direction, the inverter housing portion overlaps with the motor axis and the output axis when viewed from the second direction, the inverter housing portion has a boundary wall portion located at a boundary on the virtual straight line side of the inverter housing portion in the second direction, a distance between the boundary wall portion and the output axis is smaller than a distance between the boundary wall portion and the motor axis in the second direction, and the motor side connection portion has a portion located closer to a side opposite to the output axis than the motor axis in the third direction.

2. The drive device according to claim 1, wherein an end portion on a first side in the third direction of the inverter housing portion overlaps with an end portion on the first side in the third direction of the stator when viewed from the second direction.

3. The drive device according to claim 1, wherein the inverter has one or a plurality of substrates, and at least one of the substrates overlaps with the motor axis and the output axis when viewed from the second direction.

4. The drive device according to claim 1, wherein the inverter has a switching element and a capacitor, and the capacitor overlaps with the output axis when viewed from the second direction.

5. The drive device according to claim 1, further comprising an inverter lid that covers an opening of the inverter housing portion, wherein an electronic component of the inverter is fixed to the inverter lid.

6. The drive device according to claim 5, further comprising:

oil arranged in at least one of the motor housing portion and the gear housing portion;

a heat exchanger fixed to the housing and in which a part of an oil passage through which the oil flows is arranged; and a refrigerant channel through which a cooling medium flows, the refrigerant channel passing through the inverter lid, a part of the housing, and the heat exchanger, wherein the refrigerant channel includes an electronic component cooling portion that is arranged on the inverter lid and cools the electronic component, a heat exchange portion that is arranged in the heat exchanger and exchanges heat between the oil and the cooling medium, a lid side opening portion that is arranged in a portion connecting the electronic component cooling portion and the heat exchange portion of the refrigerant channel and is opened to the inverter lid, and a housing portion side opening portion that is arranged in a portion connecting the electronic component cooling portion and the heat exchange portion of the refrigerant channel, and is opened to the inverter housing portion, and the lid side opening portion and the housing portion side opening portion overlap with and face each other when viewed from a predetermined direction.

7. The drive device according to claim 1, further comprising:

oil arranged in at least one of the motor housing portion and the gear housing portion;

a heat exchanger fixed to the housing and in which a part of an oil passage through which the oil flows is arranged; and a refrigerant channel through which a cooling medium flows, the refrigerant channel passing through a part of the housing and the heat exchanger, wherein the refrigerant channel has a heat exchange portion that is arranged in the heat exchanger and exchanges heat between the oil and the cooling medium, and the heat exchanger is located closer to a side opposite to the motor axis than the output axis in the third direction.

8. The drive device according to claim 1, wherein the transmission mechanism includes a reduction gear having a first gear fixed to a shaft of the rotor and a second gear meshing with the first gear and rotating about an intermediate axis, and a differential gear having a ring gear connected to the reduction gear and rotating about the output axis, the intermediate axis is located in the second direction with respect to the virtual straight line, and the second gear and the inverter overlap with each other when viewed from the first direction.

9. The drive device according to claim 1, wherein the transmission mechanism has a reduction gear that decelerates rotation of the motor and a differential gear that transmits rotation of the motor decelerated by the reduction gear to the axle, and the motor and the differential gear overlap with each other when viewed from the first direction.

10. The drive device according to claim 1, wherein the transmission mechanism has a reduction gear that decelerates rotation of the motor and a differential gear that transmits rotation of the motor decelerated by the reduction gear to the axle, and the reduction gear and the inverter housing portion overlap with each other when viewed from the first direction.

11. The drive device according to claim 1, wherein in the housing, the motor housing portion and the inverter housing portion are a single member.

12. The drive device according to claim 11, wherein the transmission mechanism has a reduction gear that decelerates rotation of the motor and a differential gear that transmits rotation of the motor decelerated by the reduction gear to the axle, the inverter housing portion has a rectangular box shape having an opening portion opened in one direction, and overlaps with a part of the differential gear when viewed from a direction orthogonal to the first direction, and a portion overlapping with the part of the differential gear in the inverter housing portion is located closer to a side of the opening direction than another portion of the inverter housing portion.

13. The drive device according to claim 12, wherein the differential gear includes a ring gear meshing with a gear of the reduction gear and a differential case having an outer diameter smaller than an outer diameter of the ring gear, and the inverter housing portion overlaps with the differential case when viewed from the direction orthogonal to the first direction.

14. The drive device according to claim 13, wherein
the inverter housing portion has a first region in which a distance from the opening portion is short at a position overlapping with the differential case in the first direction when viewed from the direction orthogonal to the first direction.

15. The drive device according to claim 12, further comprising a drive shaft to which rotation is transmitted from the differential gear, wherein
the housing has a bearing support portion that supports a bearing that rotatably supports the drive shaft in a portion separated in the first direction from the ring gear of the differential gear, and
the bearing support portion radially faces the inverter housing portion.

16. A drive device comprising:
a motor having a rotor that rotates about a motor axis extending in a first direction and a stator;
an inverter that supplies power to the motor;
a transmission mechanism that transmits rotation output from the motor to an axle rotating about an output axis; and
a housing that has a motor housing portion that accommodates the motor, an inverter housing portion that accommodates the inverter, and a gear housing portion that accommodates the transmission mechanism, wherein
the motor axis and the output axis extend in parallel to each other,
the inverter is located in a second direction orthogonal to the first direction with respect to the motor axis and extends in a third direction orthogonal to the first direction and the second direction,
a virtual straight line passing through the motor axis and the output axis when viewed from the first direction extends in the third direction,
the inverter housing portion overlaps with the motor axis and the output axis when viewed from the second direction,
the inverter housing portion has a boundary wall portion located at a boundary on the virtual straight line side of the inverter housing portion in the second direction, and
a distance between the boundary wall portion and the output axis is smaller than a distance between the boundary wall portion and the motor axis in the second direction.

17. A drive device comprising:
a motor having a rotor rotatable about a motor axis extending in a first direction;
an inverter that controls current supplied to the motor;
a transmission mechanism that transmits power of the motor to an axle; and
a housing that accommodates the motor, the inverter, and the transmission mechanism, wherein
the housing includes an inverter housing portion that accommodates the inverter,
the transmission mechanism has a reduction gear that decelerates rotation of the motor and a differential gear that transmits rotation of the motor decelerated by the reduction gear to an axle, and
the inverter housing portion and the differential gear overlap with each other when viewed from the first direction,
an entirety of the inverter housing portion is located on one side of the motor axis and the output axis in a second direction perpendicular to the first direction and an up-down direction.

18. A drive device comprising:
a motor having a rotor rotatable about a motor axis extending in a first direction;
an inverter that controls current supplied to the motor;
a transmission mechanism that transmits power of the motor to an axle; and
a housing that accommodates the motor, the inverter, and the transmission mechanism, wherein
the housing includes an inverter housing portion that accommodates the inverter,
the transmission mechanism has a reduction gear that decelerates rotation of the motor and a differential gear that transmits rotation of the motor decelerated by the reduction gear to an axle, and
the inverter housing portion and the differential gear overlap with each other when viewed from the first direction,
the inverter housing portion overlaps at least a part of the differential gear in a second direction perpendicular to the first direction and an up-down direction.

* * * * *